United States Patent [19]
Wey et al.

[11] Patent Number: 6,098,100
[45] Date of Patent: Aug. 1, 2000

[54] METHOD AND APPARATUS FOR DETECTING A WAKE PACKET ISSUED BY A NETWORK DEVICE TO A SLEEPING NODE

[75] Inventors: Yih-Sheng Wey, Hsin-Chu; Yuan-Hwa Li, Taipei, both of Taiwan

[73] Assignee: Silicon Integrated Systems Corp., Hsin-Chu, Taiwan

[21] Appl. No.: 09/092,989

[22] Filed: Jun. 8, 1998

[51] Int. Cl.$^7$ .............................. G06F 13/38; G06F 15/17
[52] U.S. Cl. ......................... 709/223; 709/224; 709/236; 709/237; 340/825.5; 370/324; 370/350; 370/471; 370/472; 370/510; 370/512; 370/522
[58] Field of Search ..................................... 709/223, 236, 709/237, 224; 370/324, 350, 510, 512, 522, 471, 474; 340/825.5

[56] References Cited

U.S. PATENT DOCUMENTS

| | | | |
|---|---|---|---|
| 4,519,068 | 5/1985 | Krebs et al. ............................... | 370/82 |
| 4,531,185 | 7/1985 | Halper et al. ............................ | 364/200 |
| 4,694,473 | 9/1987 | Etoh ........................................ | 375/116 |
| 5,109,530 | 4/1992 | Stengelo ................................. | 455/38.3 |

(List continued on next page.)

FOREIGN PATENT DOCUMENTS

| | | | |
|---|---|---|---|
| 491342 | 12/1991 | European Pat. Off. .......... | G06F 9/46 |
| 918471 | 5/1999 | European Pat. Off. ......... | H04L 12/28 |
| 915592 | 12/1999 | European Pat. Off. ........ | H04L 12/28 |
| WO 96/13106 | 5/1996 | WIPO ............................. | H04L 12/12 |

OTHER PUBLICATIONS

Bhattacharya, Instruction driven wake up mechanism for snoopy TAP controller, http://www.computer.org/proceedings/vts/0146/01460467abs.htm, 5 pages, Nov. 1999.
Olivieri et al., A low power microcontroller with on chip self tuning digital clock generator for variable load applications, http://www.computer.org/proceedings/iccd/0406/04060476abs.htm, 6 pages, Nov. 1999.
Bhattacharya, The HTAP approach to accessing embedded TAPs, http://grouper.ieee.org/groups/1500/vts98/htap.pdf, 16 pages, May 1998.
Brustoloni et al. Signaled Receiver Processing, http://www.comsoc.org/socstr/techcom/tcgn/conference/gbn99/brustoloni–presentation.pdf, 7 pages, Mar. 1999.
Anonymous, Tutorial od draft standard D3.0 of IEEE P802.11, http://grouper/ieee.org.groups/802/11Tutorial/MAC.pdf, 44 pages, Mar. 1996.
Lu et al., A MAC proposal addressing 802.16 system requirements, http://grouper.ieee.org/groups/802/16/mac/contrib/80216mc–99_17.pdf, 15pages, Nov. 1999.
Du et al., Enhancing accuracy of probe packet based congestion detection in high speed networks, The John Hopkins University, Bultimore, 10 pages, Nov. 1999.

(List continued on next page.)

*Primary Examiner*—Frank J. Asta
*Assistant Examiner*—Bunjab Jaroenchonwanit
*Attorney, Agent, or Firm*—Finnegan, Henderson, Farabow, Garrett & Dunner, L.L.P.

[57] ABSTRACT

In a method and apparatus for detecting a wake packet among data bytes in a packet frame issued by a network device, the data bytes in the packet frame are initially compared with a sync byte to detect start of a synchronization stream of the wake packet. The number of consecutive sync matches of the data bytes in the packet frame with the sync byte is counted, and a partial match flag is set upon detection that the number of consecutive sync matches has reached a predetermined number of sync duplications of the sync byte to indicate that the synchronization stream has been detected in the packet frame. When the partial match flag is set, the data bytes that follow the synchronization stream in the packet frame are compared with address bytes of a destination address assigned to a sleeping node. The number of consecutive address byte matches of the data bytes in the packet frame with the address bytes of the destination address is counted, and a packet detected signal is provided to the sleeping node upon detection that the number of consecutive address byte matches has reached a pre-programmed number of address byte matches, the pre-programmed number of address byte matches being less than a total number of address bytes of a destination address stream of the wake packet.

7 Claims, 4 Drawing Sheets

U.S. PATENT DOCUMENTS

| | | | |
|---|---|---|---|
| 5,198,644 | 3/1993 | Pfeiffer et al. | 235/383 |
| 5,202,971 | 4/1993 | Henson et al. | 395/425 |
| 5,297,144 | 3/1994 | Gilbert et al. | 370/95.2 |
| 5,404,544 | 4/1995 | Crayford . | |
| 5,523,856 | 6/1996 | Kawano et al. | 358/336 |
| 5,541,920 | 7/1996 | Angle et al. | 370/61 |
| 5,560,021 | 9/1996 | Vook et al. . | |
| 5,588,005 | 12/1996 | Ali et al. | 370/346 |
| 5,592,486 | 1/1997 | Lo et al. | 370/389 |
| 5,596,315 | 1/1997 | Olds et al. | 340/825.03 |
| 5,636,220 | 6/1997 | Vook et al. . | |
| 5,675,829 | 10/1997 | Oskouy et al. . | |
| 5,781,594 | 7/1998 | Herayama | 375/354 |
| 5,809,254 | 9/1998 | Matsuzono | 709/235 |
| 5,809,417 | 9/1998 | Nealson et al. | 455/426 |
| 5,812,482 | 9/1998 | Jiang et al. | 365/230.06 |
| 5,812,617 | 9/1998 | Heckman et al. | 375/362 |
| 5,826,015 | 10/1998 | Schmidt | 395/187.01 |
| 5,835,719 | 11/1998 | Gibson et al. | 709/221 |
| 5,844,906 | 12/1998 | Khelghatti et al. | 370/474 |
| 5,860,001 | 1/1999 | Cromer et al. | 395/651 |
| 5,864,299 | 1/1999 | Nelm et al. | 340/825.44 |
| 5,905,601 | 5/1999 | Tsunoda | 360/51 |
| 5,912,886 | 6/1999 | Takahashi et al. | 370/350 |
| 5,943,328 | 8/1999 | Hosford | 370/333 |
| 5,944,797 | 8/1999 | Gregg et al. | 709/237 |
| 5,944,831 | 8/1999 | Pate et al. | 713/324 |
| 5,949,772 | 9/1999 | Sugikawa et al. | 370/331 |
| 5,973,611 | 10/1999 | Kulha et al. | 340/825.31 |
| 5,996,082 | 11/1999 | Cortopassi | 713/321 |
| 5,999,570 | 12/1999 | Chaki | 375/281 |
| 6,000,000 | 12/1999 | Hawkins et al. | 707/201 |
| 6,002,436 | 12/1999 | Anderson | 348/372 |
| 6,018,766 | 1/2000 | Samuel et al. | 709/218 |
| 6,023,213 | 2/2000 | Gulick | 710/129 |

OTHER PUBLICATIONS

Sleep and wakeup using message passing, http://www2-cne.gmu.edu/modules/ipc/pink/swmes.html ,3 pages, Aug. 1996.

Anonymous, Sleep and wakeup using monitors, http://www2-cne.gmu.edu/modules/ipc/pink/swmon.html, 2 pages, Aug. 1996.

Anonymous, Sleep and Wakeup using Semaphores, http://www2-cne.gmu.edu/modules/ipc/pink/swsem.html, 4 pages, Aug. 1996.

METHOD AND APPARATUS FOR DETECTING A WAKE PACKET ISSUED BY A NETWORK DEVICE TO A SLEEPING NODE

BACKGROUND OF THE INVENTION

1. Field of the Invention

The invention relates to the detection of packets, more particularly to a method and apparatus for detecting a wake packet issued by a network device to a sleeping node.

2. Description of the Related Art

In U.S. Pat. No. 5,404,544 issued to Crayford, there is disclosed a network connection system that includes a network controller having a transceiver for connecting the network controller to a data processing network. A data processing node is connected to the network controller, and is allowed to assume a sleep mode by the network controller for power saving purposes. The data processing network is configured to repetitively signal its presence to the transceiver when the data processing node is in the sleep mode, and the data processing node is conrigured to be awakened from the sleep mode by the transceiver in response to a wake instruction that includes a node address of the data processing node, and that was received by the transceiver from the data processing network. As such, any transmission intended for the data processing node will not be missed even if the latter is in the sleep mode.

The MAGIC PACKET technology by Advanced Micro Devices was developed with the aim of waking a sleeping node on a networking environment, such as Ethernet, token ring, etc., thereby keeping the node accessible. The technology involves the sending of a specific packet of information, hereinafter referred to as a wake packet, to a selected sleeping node. A detecting apparatus of the selected sleeping node scans all incoming transmissions from a network device, and wakes up the sleeping node upon detection of the wake packet.

The wake packet generally includes a synchronization stream and a destination address stream. The synchronization stream is defined in the MAGIC PACKET technology as a predetermined number of sync duplications of a sync byte, e.g. up to six bytes of FFh, whereas the destination address stream is defined as a predetermined number of address repetitions, e.g. up to sixteen address repetitions, of a destination address assigned to the selected sleeping node, thereby improving the chances of detecting the wake packet.

FIG. 1 illustrates a conventional detecting apparatus 1 for detecting a wake packet in a network frame that was issued by a network device. The detecting apparatus 1 is shown to comprise a frame buffer 10, a search pointer control logic 11, a search pointer 12, a back-off pointer 13, a comparator 14, a pattern counter control logic 15, a pattern counter 16 and a pattern register 17.

The frame buffer 10 is used to store incoming data transmissions from the network device (not shown). The back-off pointer 13 is connected to the search pointer 12, and the search pointer 12 controls the output of data bytes from the frame buffer 10. The search pointer control logic 11 is connected to the back-off pointer 13 and the search pointer 12, and controls incrementing, loading and clearing operations of the same. The entire wake packet assigned to the corresponding node is stored in the pattern register 17. The pattern counter 16 controls the output of data bytes from the pattern register 17, and the pattern counter control logic 15 controls incrementing and clearing operations of the pattern counter 16. The comparator 14 compares the data bytes outputted by the pattern register 17 and the frame buffer 10. The output of the comparator 14 is received by the search pointer control logic 11 and the pattern counter control logic 15. When the particular wake packet that is associated with the sleeping node is detected, the pattern counter control logic 15 generates a packet detected signal for waking up the sleeping node.

A flowchart illustrating the operation of the conventional detecting apparatus 1 is shown in FIG. 2. Initially, when the detecting apparatus 1 is activated, the search pointer control logic 11 and the pattern counter control logic 15 clear the search pointer 12, the back-off pointer 13 and the pattern counter 16 in step S10. Thereafter, in step S11, the pattern counter control logic 15 detects if the associated node is in a sleep mode, and repeats the detection step until the associated node has entered into the sleep mode. In step S12, it is detected if a packet has arrived from the network device. If no, the flow goes back to step S11. If yes, the packet frame is stored in the frame buffer 10 in step S13. In step S14, if the value in the search pointer 12 has reached the end of the frame buffer 10, the flow automatically goes back to step S10. Otherwise, in step S15, the comparator 14 compares a data byte in the frame buffer 10 that is pointed to by the search pointer 12 with a data byte in the pattern register 17 that is addressed by the pattern counter 16. If no match is detected, step S16 is performed, where the search pointer control logic 11 increments the value in the back-off pointer 13 and loads the value in the back-off pointer 13 into the search pointer 12, and where the pattern counter control logic 15 clears the pattern counter 16. The flow then goes back to step S14 after step S16. If a match was detected in step S15, step S17 is performed, where the search pointer control logic 11 increments the value in the search pointer 12, and where the pattern counter control logic 15 increments the value in the pattern counter 16. In step S18, it is detected if the value in the pattern counter 16 has reached the required pattern length, i.e. the end of the pattern register 17. If no, the flow goes back to step S14. Otherwise, step sl9 is performed, where the packet detected signal is generated by the pattern counter control logic 15 to wake up the sleeping node.

As such, the detecting apparatus 1 is capable of generating the packet detected signal upon conducting a full-block matching operation to detect a wake packet that includes a predefined synchronization stream, e.g. six bytes of FFh, followed by a destination address stream, e.g. sixteen repetitions of the destination address assigned to the selected sleeping node. If the end of the frame buffer 10 was reached without detecting a specified complete wake packet, the search pointer 12, the back-off pointer 13 and the pattern counter 16 are cleared so as to prepare the detecting apparatus 1 to detect another packet frame from the network device. The back-off pointer 13 enables the detecting apparatus 1 to detect the destination address stream in the event that the synchronization stream was immediately preceded by one or more FFh data bytes.

The drawbacks of the conventional detecting apparatus 1 are as follows:

1. A large frame buffer 10, which is capable of accommodating a network frame of up to 1518 bytes in the Ethernet networking environment, is required.

2. The full-blockmatching operation employed in the conventional detecting apparatus 1 is time consuming.

3. A complex back-off mechanism, which includes the frame buffer 10, the search pointer control logic 11, the search pointer 12 and the back-off pointer 13, is in use.

SUMMARY OF THE INVENTION

Therefore, the object of the present invention is to provide a relatively fast and simple method and apparatus for detecting a wake packet that was issued by a network device to wake up a sleeping node.

According to the present invention, there is provided a method for detecting a wake packet among data bytes in a packet frame issued by a network device to wake up a particular node. The wake packet includes a synchronization stream followed by a destination address stream. The synchronization stream includes a predetermined number of sync duplications of a sync byte. The destination address stream includes a predetermined number of address repetitions of a destination address assigned to the particular node. The detecting method comprises:

sequentially comparing the data bytes in the packet frame from the network device with the sync byte to detect start of the synchronization stream;

counting number of consecutive sync matches of the data bytes in the packet frame from the network device with the sync byte;

setting a partial match flag upon detection that the number of consecutive sync matches has reached the predetermined number of sync duplications to indicate that the synchronization stream has been detected in the packet frame;

when the partial match flag is set, sequentially comparing the data bytes that follow the synchronization stream in the packet frame from the network device with address bytes of the destination address assigned to the particular node;

counting number of consecutive address byte matches of the data bytes in the packet frame from the network device with the address bytes of the destination address; and generating a packet detected signal to be received by the particular node for waking up the particular node upon detection that the number of consecutive address byte matches has reached a pre-programmed number of address byte matches, the pre-programmed number of address byte matches being less than a total number of address bytes of the destination address stream.

In the preferred embodiment, a detecting apparatus for detecting a wake packet among data bytes in a packet frame issued by a network device to wake up a particular node comprises a counter control logic, a status register unit, a pattern register unit, a target length register, a data comparator, and a length comparator.

The status register unit includes a pattern counter and a partial match flag connected to the counter control logic. The counter control logic operates the partial match flag in one of a reset state and a set state.

The pattern register unit includes a sync byte register for storing the sync byte, an address resister for storing sequentially address bytes of the destination address assigned to the particular node, and a selector connected to the sync byte register, the address register and the partial match flag. The selector outputs the sync byte from the sync byte register when the partial match flag is in the reset state, and the address bytes from the address register when the partial match flag is in the set state.

The target length register stores a sync stream length and a destination address stream length therein. The sync stream length is equal to the predetermined number of sync duplications. The destination address stream length is less than a total number of address bytes of the destination address stream. The target length register is connected to the partial match flag, and outputs the sync stream length when the partial match flag is in the reset state, and the destination address stream length when the partial match flag is in the set state.

The data comparator is connected to the selector and the counter control logic, and is adapted to receive the packet frame from the network device. The data comparator is adapted to sequentially compare the data bytes in the packet frame from the network device with the sync byte from the selector to detect start of the synchronization stream when the partial match flag is in the reset state, and is adapted to sequentially compare the data bytes that follow the synchronization stream in the packet frame from the network device with the address bytes of the destination address assigned to the particular node from the selector when the partial match flag is in the set state. The data comparator provides a data match signal to the counter control logic whenever a match between the output of the selector and one of the data bytes in the packet frame from the network device is detected thereby.

The counter control logic controls the pattern counter upon receipt of the data match signal from the data comparator to count number of consecutive sync matches of the data bytes in the packet frame from the network device with the sync byte from the selector when the partial match flag is in the reset state, and to count number of consecutive address byte matches of the data bytes in the packet frame from the network device with the address bytes of the destination address from the selector when the partial match flag is in the set state.

The length comparator is connected to the pattern counter, the target length register and the counter control logic. The length comparator compares the count value in the pattern counter with the sync stream length from the target length register when the partial match flag is in the reset state, and provides a sync detect signal to the counter control logic when the count value in the pattern counter reaches the sync stream length from the target length register while the partial match flag is in the reset state. The counter control logic operates the partial match flag in the set state upon receipt of the sync detect signal to indicate that the synchronization stream has been detected in the packet frame. The length comparator further compares the count value in the pattern counter with the destination address stream length from the target length register when the partial match flag is in the set state, and provides a destination address detect signal to the counter control logic when the count value in the pattern counter reaches the destination address stream length from the target length register while the partial match flag is in the reset state.

The counter control logic generates a packet detected signal adapted to be received by the particular node in order to wake up the particular node upon receipt of the destination address detect signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
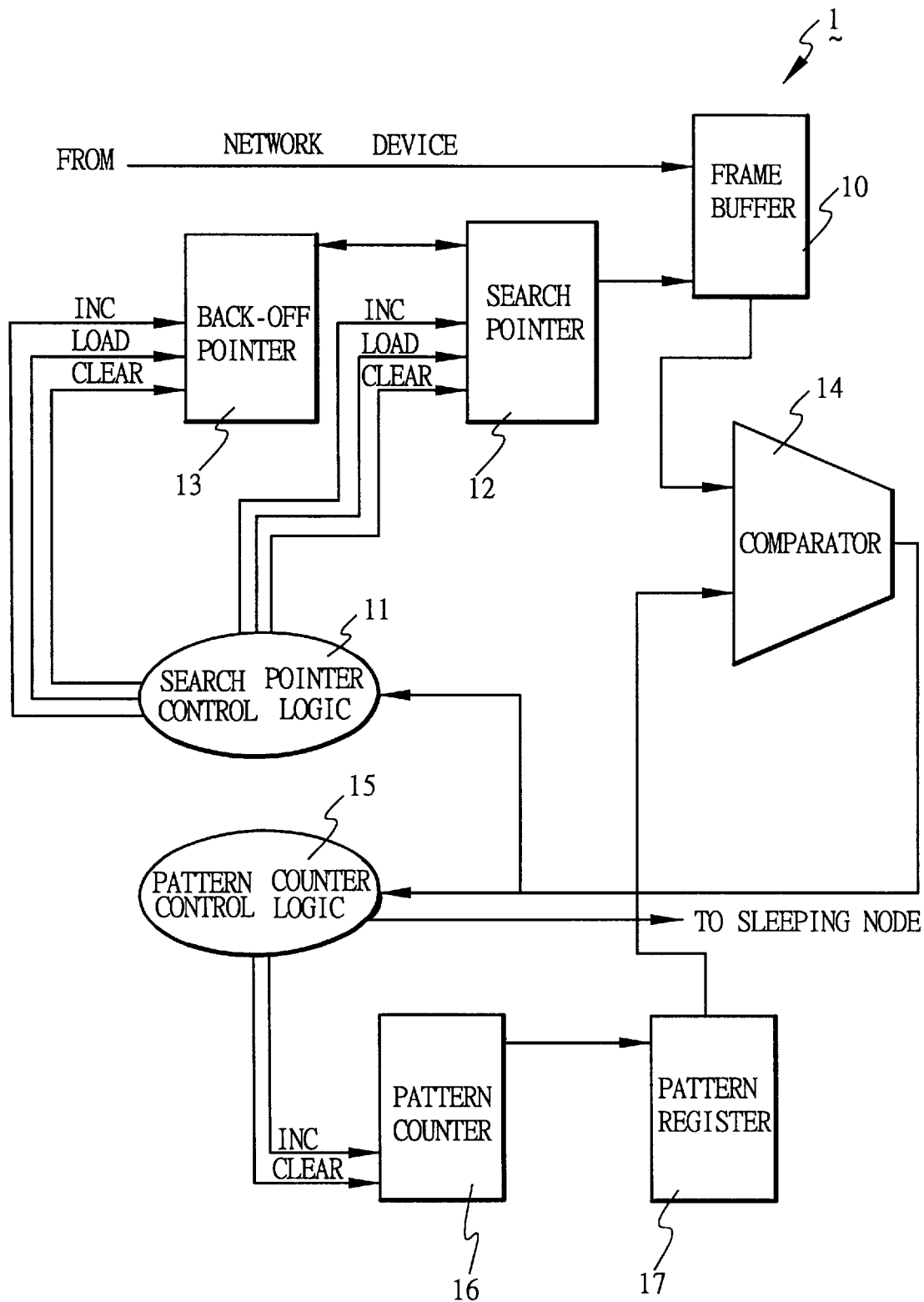
FIG. 1 is a schematic circuit block diagram illustrating a conventional detecting apparatus for detecting a wake packet that was issued by a network device.
Figure 2:
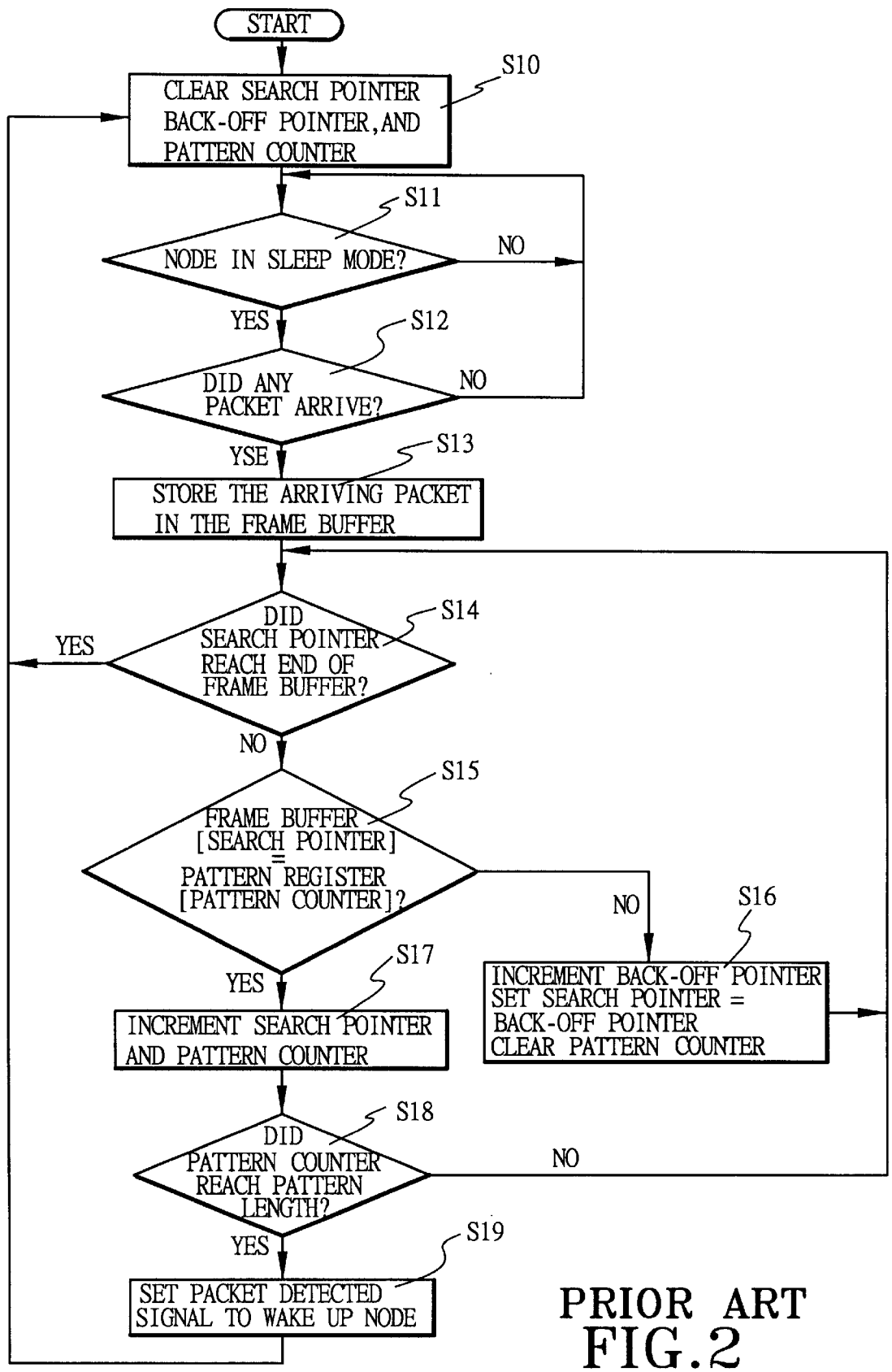
FIG. 2 is a flowchart illustrating the operation of the conventional detecting apparatus of FIG. 1.
Figure 3:
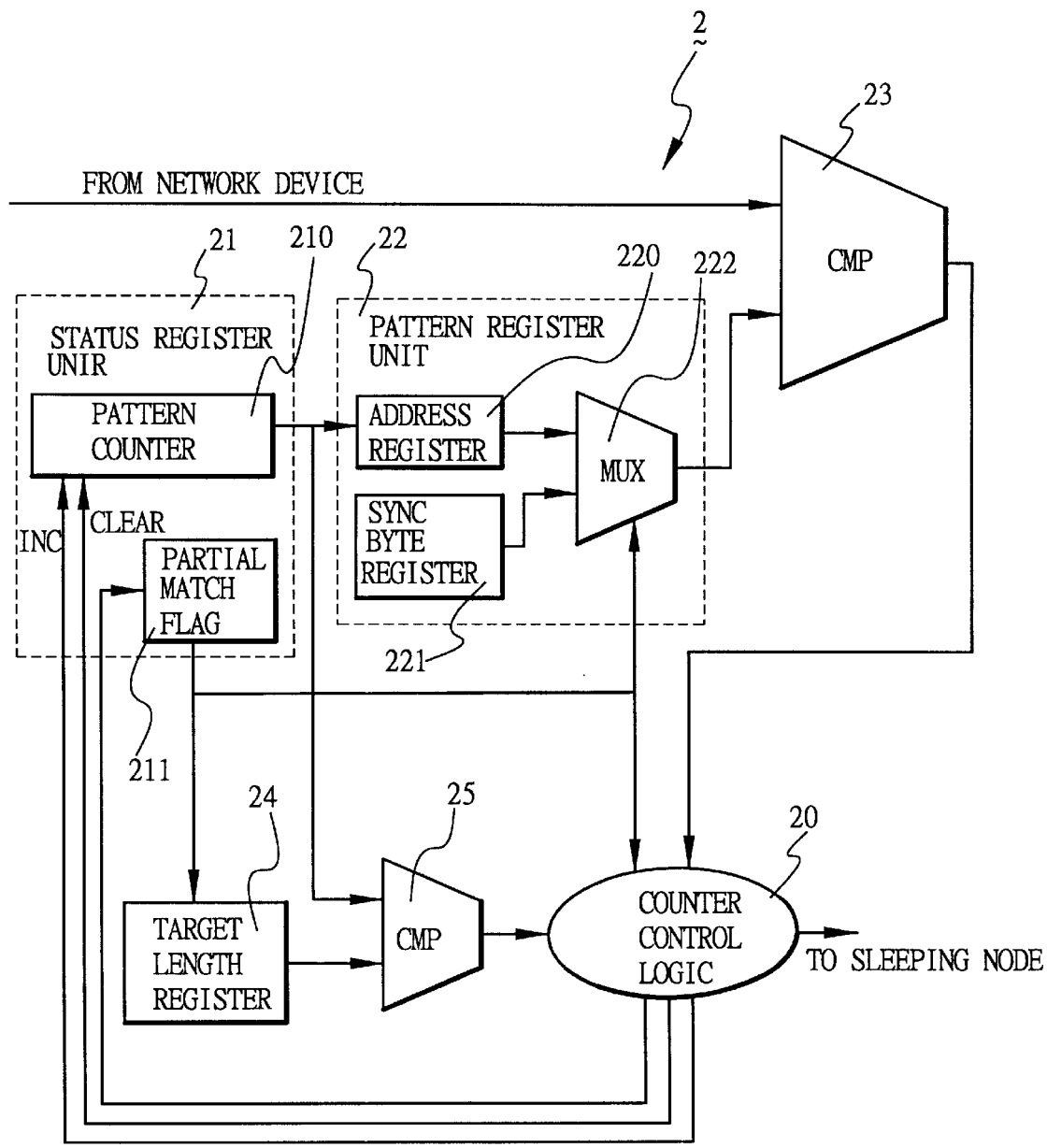
FIG. 3 is a schematic circuit block diagram of the preferred embodiment of a detecting apparatus for detecting a wake packet issued by a network device in accordance with the present invention.

Referring to FIG. 3, the preferred embodiment of a detecting apparatus 2 according to the present invention is capable of detecting the presence of a wake packet among data bytes in a packet frame issued by a network device to wake up a corresponding node, and generates a packet detected signal to wake up the corresponding node upon detection of the wake packet. The wake packet includes a synchronization stream followed by a destination address stream. The synchronization stream includes a predetermined number of sync duplications of a sync byte, e.g. six bytes of FFh. The destination address stream includes a predetermined number of address repetitions, e.g. up to sixteen address repetitions, of a destination address assigned to the corresponding node. The detecting apparatus 2 comprises a counter control logic 20, a status register unit 21, a pattern register unit 22, a data comparator 23, a target length register 24, and a length comparator 25.

The status register unit 21 includes a pattern counter 210 and a partial match flag 211, both of which are connected to the counter control logic 20. The counter control logic 20 controls incrementing and clearing operations of the pattern counter 210, and set and reset operations of the partial match flag 211. The pattern register unit 22 includes an address register 220 for storing sequentially address bytes of the destination address that is assigned to the corresponding node, a sync byte register 221 for storing the sync byte, e.g. FFh, and a multiplexer 222. The multiplexer 222 acts as a selector, and has data inputs connected to the address register 220 and the sync byte register 221, and a select input connected to the counter control logic 20. The address register 220 is addressed by the pattern counter 210. The multiplexer 222 outputs one of the sync byte from the sync byte register 221 and the address bytes from the address register 220 depending on the state of the partial match flag 211. The output of the multiplexer 222 is received by the data comparator 23 so as to enable the latter to compare the same with data bytes of a packet frame from the network device. The data comparator 23 provides a data match signal to the counter control logic 20 whenever a match between the output of the multiplexer 222 and one of the data bytes in the packet frame from the network device is detected thereby. The target length register 24 contains a sync stream length and a programmable destination address stream length, and is addressed by the partial match flag 211. The sync stream length is equal to the predetermined number of sync duplications of the sync byte in the synchronization stream of the wake packet. The destination address stream length is less than the total number of address bytes of the destination address stream of the wake packet. The counter control logic 20 controls the pattern counter 210 upon receipt of the data match signal from the data comparator 23 to count number of consecutive sync matches of the data bytes in the packet frame from the network device with the output of the multiplexer 222 when the synchronization stream is being detected, and to count number of consecutive address byte matches of the data bytes in the packet frame from the network device with the output of the multiplexer 222 when the destination address stream is being detected.

The output of the target length register 24 is compared with the value in the pattern counter 210 by the length comparator 25. When the count value in the pattern counter 210 reaches the sync stream length while the partial match flag 211 is in the reset state, a sync detect signal is provided by the length comparator 25 to the counter control logic 20 to enable the latter to set the partial match flag 211. When the count value in the pattern counter 210 reaches the destination address stream length while the partial match flag 211 is in the set state, a destination address detect signal is provided by the length comparator 25 to the counter control logic 20 to enable the latter to generate a packet detected signal to be received by the corresponding node in order to wake up the corresponding node.

Figure 4:
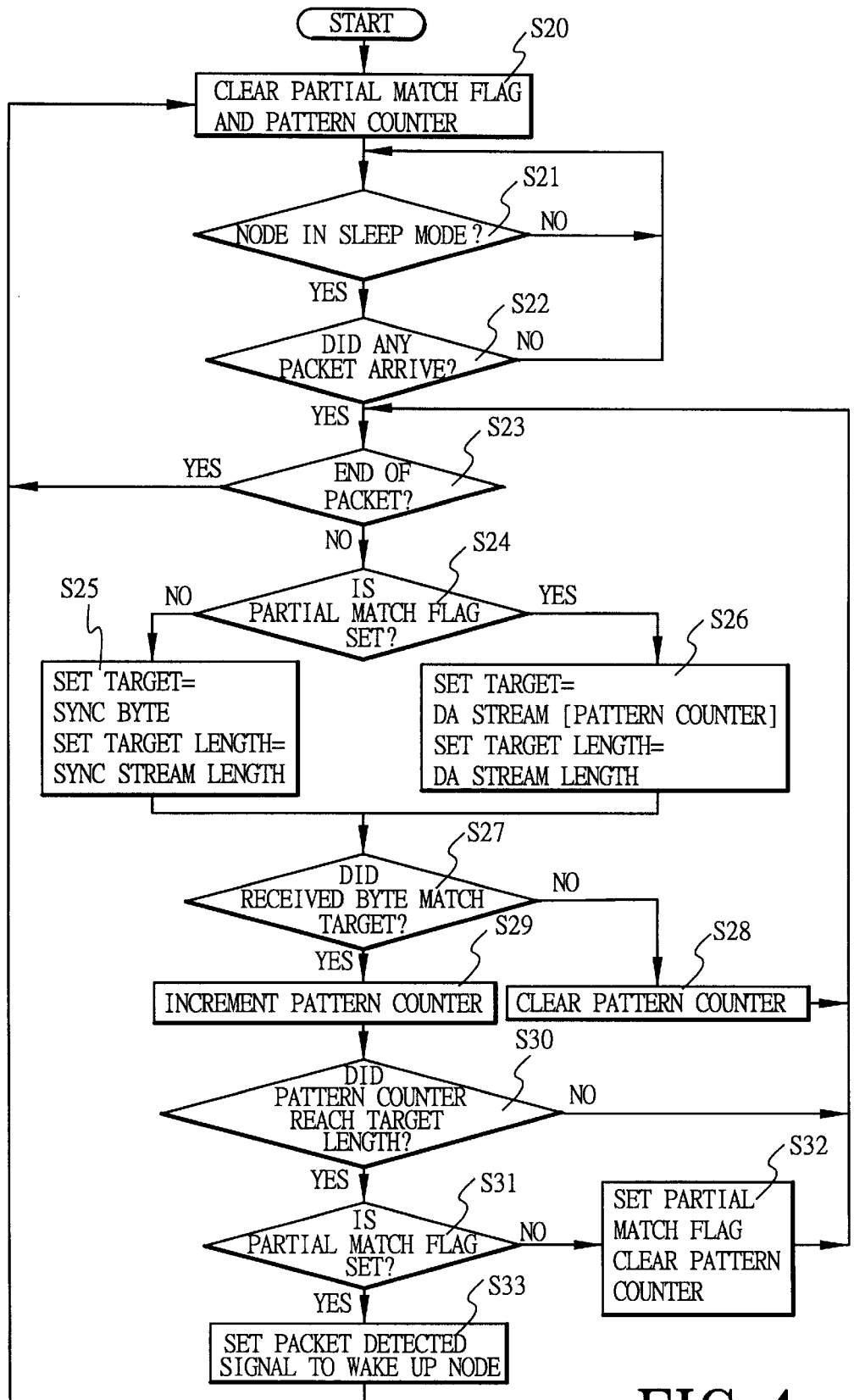
FIG. 4 is a flowchart illustrating the operation of the detecting apparatus of FIG. 3.

A flowchart illustrating the operation of the detecting apparatus 2 is shown in FIG. 4. Initially, when the detecting apparatus 2 is activated, the pattern counter 210 is cleared, and the partial match flag 211 is reset by the counter control logic 20 in step S20. Thereafter, in step S21, the counter control logic 20 detects if the associated node is in a sleep mode, and repeats the detection step until the associated node has entered into the sleep mode. In step S22, it is detected if a packet has arrived from the network device. If no, the flow goes back to step S21. Otherwise, it is detected if the end of the packet frame has been received from the network device in step S23. If yes, the flow goes back to step S20. If no, it is determined in step S24 if the partial match flag 211 has been set. In step S25, if the partial match flag 211 has not been set, indicating that the synchronization stream of the wake packet has not yet been detected, the multiplexer 222 provides the sync byte in the sync byte register 221 to the data comparator 23, whereas the target length register 24 provides the sync stream length to the length comparator 25. In step S26, if the partial match flag 211 has been set, indicating that the synchronization stream of the wake packet has been detected, the multiplexer 222 provides the output of the address register 222 to the data comparator 23, whereas the target length register 24 provides the destination address stream length to the length comparator 25. In step S27, the data comparator 23 detects if the data byte from the network device matches the output of the multiplexer 222. If no, the counter control logic 20 clears the pattern counter 210 in step S28, and the flow goes back to step S23. Otherwise, in step S29, the counter control logic 20 increments the value in the pattern counter 210 and, in step S30, the length comparator 25 detects if the value in the pattern counter 210 has reached the output of the target length register 24. In step S31, it is determined if the partial match flag 211 has been set. If no, the partial match flag 211 is set, and the pattern counter 210 is cleared by the counter control logic 20 in step S32, thereby indicating that the synchronization stream of a wake packet has been detected. The flow goes back to step S23 to detect the presence of the destination address stream. If it is detected that the partial match flag 211 has been set in step S31, the packet detected signal is generated by the counter control logic 20 to wake up the sleeping node.

As such, the detecting apparatus 2 is capable of generating the packet detected signal upon detection of a wake packet that includes a predefined synchronization stream, e.g. six bytes of FFh, followed by a destination address stream. Detection of the destination address stream is commenced only upon detection of a complete synchronization stream. Since false alarms are acceptable, a signature matching operation is employed, where only a programmable length of the destination address stream is detected, independent of where the programmable length of the destination address stream appears after the synchronization stream in the packet frame from the network device. Thus, all of the sixteen repetitions of the destination address assigned to the corresponding node need not be detected in the detecting method and apparatus of this invention. The detection of the synchronization stream is not repeated in the event that an incorrect destination address appears in the destination address stream of the packet frame from the network device. In addition, since signature matching is applied in the detecting method and apparatus of this invention, the need for a complex back-off mechanism can be obviated. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for detecting a wake packet among data bytes in a packet frame issued by a network device to wake up a particular node, the wake packet including a synchronization stream followed by a destination address stream, the synchronization stream including a predetermined number of sync duplications of a sync byte, the destination address stream including a predetermined number of address repetitions of a destination address assigned to the particular node, the method comprising:

sequentially comparing the data bytes in the packet frame from the network device with the sync byte to detect start of the synchronization stream;

counting number of consecutive sync matches of the data bytes in the packet frame from the network device with the sync byte;

setting a partial match flag upon detection that the number of consecutive sync matches has reached the predetermined number of sync duplications to indicate that the synchronization stream has been detected in the packet frame;

when the partial match flag is set, sequentially comparing the data bytes that follow the synchronization stream in the packet frame from the network device with address bytes of the destination address assigned to the particular node;

counting number of consecutive address byte matches of the data bytes in the packet frame from the network device with the address bytes of the destination address; and generating a packet detected signal to be received by the particular node for waking up the particular node upon detection that the number of consecutive address byte matches has reached a pre-programmed number of address byte matches, the pre-programmed number of address byte matches being less than a total number of address bytes of the destination address stream.

2. A detecting apparatus for detecting a wake packet among data bytes in a packet frame issued by a network device to wake up a particular node, the wake packet including a synchronization stream followed by a destination address stream, the synchronization stream including a predetermined number of sync duplications of a sync byte, the destination address stream including a predetermined number of address repetitions of a destination address assigned to the particular node, said detecting apparatus comprising:

means, adapted to be connected to the network device, for sequentially comparing the data bytes in the packet frame from the network device with the sync byte to detect start of the synchronization stream;

means for counting number of consecutive sync matches of the data bytes in the packet frame from the network device with the sync byte;

a partial match flag;

means, connected to said partial match flag, for setting said partial match flag upon detection that the number of consecutive sync matches has reached the predetermined number of sync duplications to indicate that the synchronization stream has been detected in the packet frame;

means, adapted to be connected to the network device, for sequentially comparing the data bytes that follow the synchronization stream in the packet frame from the network device with address bytes of the destination address assigned to the particular node when the partial match flag is set;

means for counting number of consecutive address byte matches of the data bytes in the packet frame from the network device with the address bytes of the destination address; and means for generating a packet detected signal adapted to be received by the particular node in order to wake up the particular node upon detection that the number of consecutive address byte matches has reached a pre-programmed number of address byte matches, the pre-programmed number of address byte matches being less than total number of address bytes of the destination address stream.

3. A detecting apparatus for detecting a wake packet among data bytes in a packet frame issued by a network device to wake up a particular node, the wake packet including a synchronization stream followed by a destination address stream, the synchronization stream including a predetermined number of sync duplications of a sync byte, the destination address stream including a predetermined number of address repetitions of a destination address assigned to the particular node, said detecting apparatus comprising:

a counter control logic;

a status register unit including a pattern counter and a partial match flag connected to said counter control logic, said counter control logic operating said partial match flag in one of a reset state and a set state;

a pattern register unit including a sync byte register for storing the sync byte, an address resister for storing sequentially address bytes of the destination address assigned to the particular node, and a selector connected to said sync byte register, said address register and said partial match flag, said selector outputting the sync byte from said sync byte register when said partial match flag is in the reset state, and the address bytes from said address register when said partial match flag is in the set state;

a target length register for storing a sync stream length and a destination address stream length therein, the sync stream length being equal to the predetermined number of sync duplications, the destination address stream length being less than total number of address bytes of the destination address stream, said target length register being connected to said partial match flag and outputting the sync stream length when said partial match flag is in the reset state, and the destination address stream length when said partial match flag is in the set state;

a data comparator connected to said selector and said counter control logic, and adapted to receive the packet frame from the network device, said data comparator being adapted to sequentially compare the data bytes in the packet frame from the network device with the sync byte from said selector to detect start of the synchronization stream when said partial match flag is in the reset state, and being adapted to sequentially compare the data bytes that follow the synchronization stream in the packet frame from the network device with the address bytes of the destination address assigned to the particular node from said selector when said partial match flag is in the set state, said data comparator providing a data match signal to said counter control logic whenever a match between output of said selector and one of the data bytes in the packet frame from the network device is detected thereby;

said counter control logic controlling said pattern counter upon receipt of the data match signal from said data comparator to count number of consecutive sync matches of the data bytes in the packet frame from the network device with the sync byte from said selector when said partial match flag is in the reset state, and to count number of consecutive address byte matches of the data bytes in the packet frame from the network device with the address bytes of the destination address from said selector when said partial match flag is in the set state; and a length comparator connected to said pattern counter, said target length register and said counter control logic, said length comparator comparing count value in said pattern counter with the sync stream length from said target length register when said partial match flag is in the reset state, and providing a sync detect signal to said counter control logic when the count value in said pattern counter reaches the sync stream length from said target length register while said partial match flag is in the reset state, said counter control logic operating said partial match flag in the set state upon receipt of the sync detect signal to indicate that the synchronization stream has been detected in the packet frame, said length comparator further comparing the count value in said pattern counter with the destination address stream length from said target length register when said partial match flag is in the set state, and providing a destination address detect signal to said counter control logic when the count value in said pattern counter reaches the destination address stream length from said target length register while said partial match flag is in the reset state;

said counter control logic generating a packet detected signal adapted to be received by the particular node in order to wake up the particular node upon receipt of the destination address detect signal.

4. The detecting apparatus as claimed in claim 3, wherein said selector is a multiplexer.

5. The detecting apparatus as claimed in claim 3, wherein said address register is connected to said pattern counter so as to be addressed thereby.

6. The detecting apparatus as claimed in claim 3, wherein said counter control logic clears said pattern counter whenever said data comparator fails to detect a match between the output of said selector and one of the data bytes in the packet frame from the network device.

7. The detecting apparatus as claimed in claim 6, wherein said counter control logic further clears said pattern counter whenever said partial match flag is operated from the reset state to the set state.

* * * * *